July 27, 1948.  T. R. BENDA  2,445,758
HANGER
Filed April 27, 1945
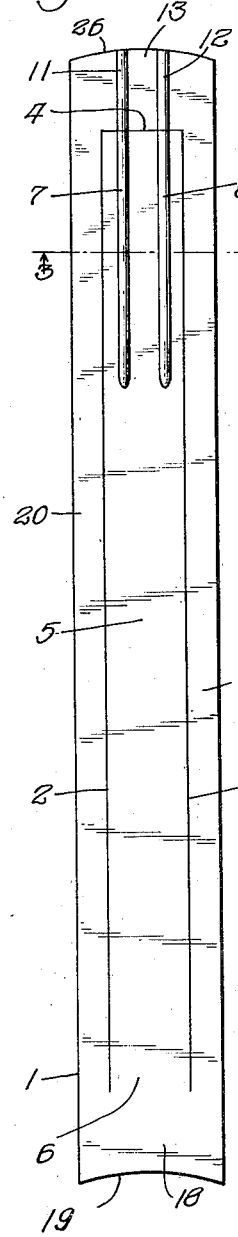
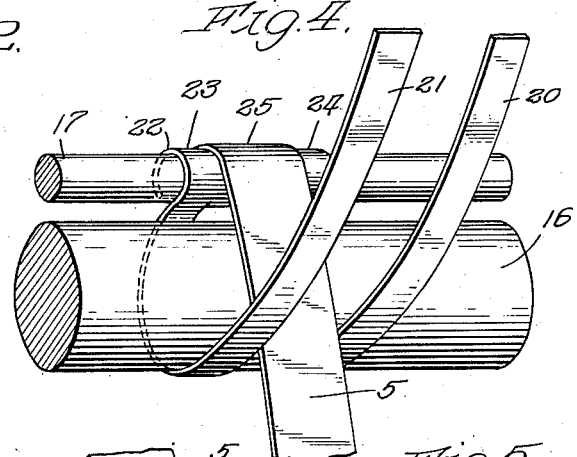
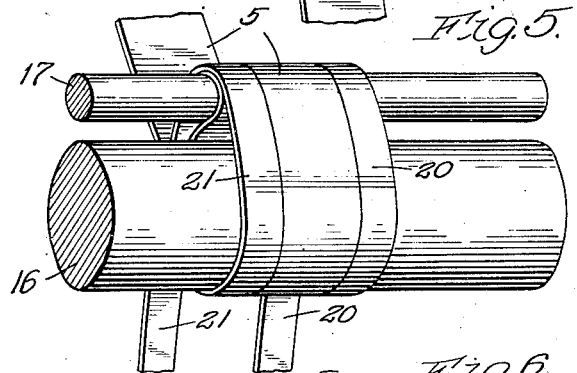
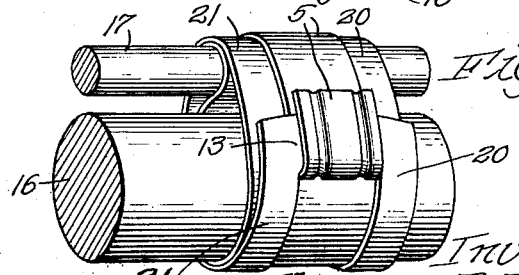
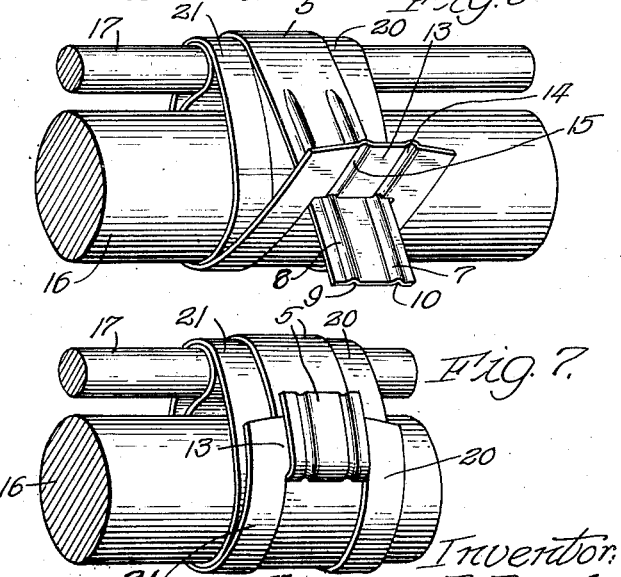
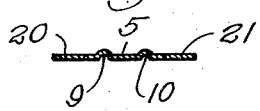
Inventor:
Theodore R. Benda,
By Christen, Wiles, Schroeder,
Merriam, & Lynch, Attys.

Patented July 27, 1948

2,445,758

UNITED STATES PATENT OFFICE 2,445,758

HANGER

Theodore R. Benda, Villa Park, Ill., assignor to Excel Incorporated, a corporation of Illinois Application April 27, 1945, Serial No. 590,528

9 Claims. (Cl. 248—61)

This invention relates to a hanger and more particularly to a hanger for supporting cables, bunched wires, or other similar elongated objects from a supporting element, strand or the like for supporting such cables, bunched wires or the like, which would not be self supporting throughout any extended space.

An example of such cables are the cables used by telephone companies, or cables for other communication and transmission purposes, in which cables are generally mounted a large number of pairs of insulated wires, such groups of wires being covered on the exterior of the cable with a lead covering. Because of the weight of the lead covering plus the weight of the wires, such cables are not self supporting any considerable distance from one support to another, their weight being so great that it would cause the cable to break unless supported at frequent intervals to a messenger or other supporting wire which is of sufficient strength to support the cable.

The purpose of the present invention is to provide a novel hanger for supporting such cables or the like to a messenger wire or the like, in such manner that the hanger effecting such support can be quickly and efficiently applied and maintained.

Among the objects of this invention is to provide a hanger of the character referred to, which is formed of thin, easily bendable metal of strap-like form having an elongated tongue struck therefrom and integrally connected therewith at one end, so as to enable a quick application of the hanger which is so arranged that it will not become loose or permit the cable to unduly sag; a further object being to provide embossed beads or ridges at the free end of the tongue and in the closed end of the hanger adjacent the free end; another object being to provide a hanger which is shorter in initial length than hangers heretofore known and so formed as to eliminate waste scrap material, and enable more economical packing and storing of such hangers; a still further feature being to provide a hanger having parts that may be bent in opposite directions around a cable and the messenger or other support; another advantage being that the present hanger better conforms to the cable because the hanger can be of thinner stock; an additional object being to provide a hanger having a greater reuse value because of its being easily straightened out and capable of being rebent to straight position; another feature being the provision of a novel arrangement of tongue capable of being so bent in the final operation of applying the hanger as to hold a greater weight with greater safety; a further object being to provide a hanger made of thin stock which minimizes cracking due to cold both when installing and during its later use; a still further object being to provide a hanger that can be made of various material or different surfaces at different parts to eliminate electrolytic or galvanic action; to provide in a hanger an end construction such that when the tongue is bent back over the closed end of the hanger a bead or beads in one of these members will fit into a complemental groove or grooves in the other part to increase the gripping action; further to provide a hanger of thin easily bendable metal that will not be injured during use by any tearing action; and such further features, objects, advantages and capabilities inherently possessed by my invention as will later more fully appear.

My invention further resides in the combination, construction and arrangement of parts illustrated in the accompanying drawings, and while I have shown therein a preferred embodiment, I wish it understood that the same is susceptible of modification and change without departing from the spirit of my invention.

In the drawings:

Fig. 1 is a top plan view of a hanger embodying my invention, laid out flat before being bent around a cable and supporting wire or strand.

Fig. 2 is an edge view looking toward the right hand edge of Fig. 1.

Fig. 3 is a transverse section on the line 3—3 of Fig. 1.

Fig. 4 is a fragmentary perspective view of a cable and messenger wire with my improved hanger partially started therearound during the fastening operation.

Fig. 5 is a view similar to Fig. 4 but showing the hanger as being bent to a further stage of the fastening operation.

Fig. 6 is a similar view but showing the hanger as bent to near the final stage of the fastening operation and prior to bending the end of the tongue into final position.

Fig. 7 is a view similar to Fig. 6 but showing the hanger in completely affixed position.

Referring more in detail to the drawings, and more particularly to Figs. 1, 2 and 3, my improved hanger comprises an elongated strap-like member 1 having two elongated slits 2 and 3 therethrough with a transverse slit 4 adjacent one end of the member and adjoining slits 2 and 3, these slits being extended entirely through the metal of the member so as to form a tongue 5 which is integrally connected to the member 1 only at the end 6. As will be understood, this construction enables the tongue to be swung out away from the plane of the strap-like member 1 and the tongue and member to be wrapped around a cable and messenger in the manner shown in Figs. 4 to 7 as later more fully explained.

As seen in Figs. 1 to 3 I have provided a pair of longitudinally extending beads 7 and 8 which are pressed out of the metal of the free end of the tongue to form outwardly extending beads 7 and 8 on one side, and complemental grooves 9 and 10 on the other side, (also see Fig. 6). Similar beads 11 and 12 are pressed into the metal of the strap-like member 1 adjacent to the free end of the tongue 5, beads 11 and 12 being similar to beads 7 and 8 and respectively in longitudinal alinement therewith. As will be understood, on the opposite face of the end 13 of the member 1 will be grooves 14 and 15 similar to grooves 9 and 10 in the tongue (see Fig. 6).

The strap-like member 1, constituting my improved hanger, may be made of thin aluminum, copper, zinc, or other easily bendable metal. While not wishing to be limited thereto I have obtained very good results with a hanger made of .020 inch thickness of stock, and have demonstrated that my hangers with this thickness will hold as much or more than other forms of hanger made of heavier stock.

In Figs. 4 to 7 I have shown my hanger as applied for supporting a cable or the like 16 to a messenger or other elongated supporting member 17, the application of my hanger to these or other similar parts being accomplished as follows. The unbeaded closed end 18 of my hanger, which end is preferably slightly inwardly curved at 19, is bent about midway around the upper side of the messenger to closely follow the contour thereof to form a hook 22 thereover (see Fig. 4), and then downwardly on the near side of the messenger and rearwardly thereunder, and then downwardly around the rear side of the cable and under the bottom of the cable, and then upwardly so that the integral side arms 20, 21 stand roughly in the position shown in Fig. 4. During this operation the tongue 5 is passed rearwardly around the bottom and rear side of the messenger and then upwardly and forwardly over the top thereof, and then downwardly through the space or slot between the arms 20, 21.

The arms 20, 21 are then bent upwardly over the front side of the cable, rearwardly over the seats 23 and 24 at the top of the messenger on the two sides of the tongue; the tongue being bent downwardly at the front and closely under the cable and then upwardly on the rear thereof and forwardly over the top 25 of the first lap of the tongue, while the arms 20, 21 are at the same time continued downwardly on the rear side of the messenger to the bottom of the cable and then upwardly in front of the cable with the beaded end of the tongue passing through the slot between arms 20, 21 so that the parts will occupy the position shown in Fig. 6.

The beaded adjacent ends of the tongue and strap member are then pressed closely against the assembly with the beaded end of the tongue underneath the end 13 of the member 1. The beaded end of the tongue is then bent upwardly and pressed firmly against the end 13 as shown in Fig. 7 which will cause the beads 7 and 8 to be closely seated into the adjacent grooves 14 and 15 of the end 13, to firmly interlock the same together against slipping and to securely grip these ends together, the beads tending to prevent straightening out of the bent end of the tongue under load on the hanger.

As will be understood, during the above operations, the various parts of the hanger while being wound around the cable and supporting element will be closely applied against each part while being wound so that no undue looseness will occur other than the usual vertical gap between the messenger or other supporting element and the cable. It is also to be noted that regardless of which face of the hanger is applied to the messenger when starting the wrapping operation either the beads of the free end of the tongue, or the beads in the end of the strap-like member, will fit into complemental grooves in the other of these two parts.

The inner face of the hook portion 22 of the hanger may, if desired, be coated with copper or other suitable material to eliminate galvanic or electrolytic action at these two points. Due to the easily bendable nature of the thin metal of the hanger, the hanger does not break, and due to the embossed beads on the free end of the tongue the tongue will not inadvertently slip sidewise or open up. This embossing makes the bent end of the tongue remain in its final bent position when its beads seat in the adjacent grooves of the closed end of the hanger, or the grooves of the free end of the tongue seat over the beads in the closed end of the hanger, depending upon which side of the hanger is positioned up when being applied in position.

It is also to be noted that due to the substantially rectangular shape of the hanger when laid out flat there are no waste scrap parts to cause loss, but the hangers can be formed by passing a long strip of the metal blank through the stamping machine, and the hangers are quickly stamped out in large numbers including the embossed parts to give quick production with no loss. The end 13 of the hanger is slightly curved outwardly at 26 to correspond to the curve 19 in the opposite end. This general construction of the hanger in addition to eliminating loss by waste, also enables more compact and economical storing. The messenger wire is generally copper coated with a steel core load wire, although other forms of supporting member may be used if desired.

Having described my invention, I claim:

1. A hanger for supporting cables to messenger strands, comprising: a thin easily bendable strap having a pair of side slits, one near each of the longitudinal edges, and an end slit near one end of the strap joining the side slits to form an elongated tongue joined at one end to the strap, the other end being free, the tongue extending nearly the full length of the strap so that its ends are near the strap ends.

2. A hanger for supporting cables and the like, comprising: an elongated strap-like member of thin easily bendable metal, having an elongated tongue integrally attached thereto at one end only; and stiffening beads in the free end of the tongue, the tongue extending nearly the full length of the strap so that its ends are near the strap ends.

3. A hanger for supporting cables and the like, comprising: an elongated strap-like member of thin easily bendable metal, having an elongated tongue integrally attached thereto at one end only; and stiffening beads in the free end of the tongue, and in the adjacent end of the strap-like member, the tongue extending nearly the full length of the strap so that its ends are near the strap ends.

4. A hanger for supporting a cable or the like to a messenger wire or the like, comprising: a thin easily bendable elongated metal strap member having an elongated tongue stamped therefrom but integrally connected thereto at one end, the end of the strap member adjacent where the tongue is connected thereto being bent to form a hook positioned over the upper side of the messenger wire, the tongue extending rearwardly under the messenger wire, then upwardly around the rear thereof and forwardly and downwardly over the top of the hook, the strap member extending rearwardly between the cable and messenger wire and downwardly around the rear and bottom of the cable, the tongue then extending entirely around the assembly of the cable and messenger wire and again to the front, and the strap member then extending entirely around the assembly of the cable and messenger wire to the front in the opposite direction to that of the tongue, the free end of the tongue extending through the strap member and back over the end of the same in the form of a closed hook.

5. A hanger for supporting a cable or the like to a messenger wire or the like, comprising: a thin easily bendable elongated metal strap member having an elongated tongue stamped therefrom but integrally connected thereto at one end, the end of the strap member adjacent where the tongue is connected thereto being bent to form a hook positioned over the upper side of the messenger wire, the tongue extending rearwardly under the messenger wire, then upwardly around the rear thereof and forwardly and downwardly over the top of the hook, the strap member extending rearwardly between the cable and messenger wire and downwardly around the rear and bottom of the cable, the tongue then extending entirely around the assembly of the cable and messenger wire and again to the front, and the strap member then extending entirely around the assembly of the cable and messenger wire to the front in the opposite direction to that of the tongue, the free end of the tongue extending through the strap member and back over the end of the same in the form of a closed hook, the free end of the tongue and the adjacent end of the strap member having interengaging bead and groove formation.

6. A hanger for supporting a cable or the like to a messenger wire or the like, comprising: a thin easily bendable elongated strap member having a tongue stamped from the body thereof to form a slot when the tongue is bent away from the strap but integrally connected thereto at one end of the tongue, a hook on the end of the strap member adjacent where the tongue is integrally connected thereto, said hook being seated on the messenger wire, the strap member and the tongue extending entirely around the cable and messenger wire assembly in opposite directions, and connected together at their end portions in hook formation, the tongue passing through the slot at the bight of the last mentioned hook formation.

7. A hanger for supporting a cable or the like to a messenger wire or the like, comprising: a thin easily bendable elongated strap member having a tongue stamped from the body thereof but integrally connected thereto at one end of the tongue, a hook on the end of the strap member adjacent where the tongue is integrally connected thereto, said hook being seated on the messenger wire, the strap member and the tongue extending around the cable and messenger wire assembly in opposite directions, and connected together at their end portions in hook formation, the free end of the tongue and the adjacent end of the strap member having interengaging bead and groove formation.

8. A hanger for supporting a cable or the like to a messenger wire or the like, comprising: a thin easily bendable elongated strap member having a tongue stamped from the body thereof but integrally connected thereto at one end of the tongue, a hook on the end of the strap member adjacent where the tongue is integrally connected thereto, said hook being seated on the messenger wire, the strap member and the tongue extending around the cable and messenger wire assembly in opposite directions, and connected together at their end portions in hook formation, the free end portion of the tongue and the adjacent end of the strap member having longitudinally extending embossed stiffening beads in interengaging relation to prevent slipping.

9. A hanger for supporting a cable or the like to an elongated supporting member, comprising: a thin, easily bendable, metallic strap-like member having at one end a longitudinally extending embossed portion forming a bead on one side and a groove on the other side, a pair of substantially parallel spaced slits extending longitudinally from near one end of the strap-like member to near the other end thereof, and a cross slit extending from the end of one of the longitudinal slits to the adjacent end of the other longitudinal slit, said cross slit extending laterally through the embossed portion at an intermediate point of its length, said slits forming an elongated tongue, the embossed portion in the tongue being in alinement with the embossed portion in the strap-like member end so that when the end portion of the tongue is bent into a hook formation around said member end the bead in one of said parts will be seated into the groove of the other.

THEODORE R. BENDA.

REFERENCES CITED

The following references are of record in the file of this patent:

UNITED STATES PATENTS

| Number | Name | Date |
|---|---|---|
| 516,205 | Johnson | Mar. 13, 1894 |
| 1,022,226 | Davis | Apr. 2, 1912 |